(12) United States Patent
Cohen

(10) Patent No.: US 9,573,054 B2
(45) Date of Patent: Feb. 21, 2017

(54) SOCIAL GAME CONCERNING PHOTOGRAPH MANIPULATION FOR PLAY ACROSS DISTRIBUTED DEVICES

(71) Applicant: Grahame Keith Cohen, London (GB)

(72) Inventor: Grahame Keith Cohen, London (GB)

(73) Assignee: Grahame Keith Cohen, London (GB)

( * ) Notice: Subject to any disclaimer, the term of this patent is extended or adjusted under 35 U.S.C. 154(b) by 434 days.

(21) Appl. No.: 14/290,630

(22) Filed: May 29, 2014

(65) Prior Publication Data

US 2014/0357362 A1    Dec. 4, 2014

Related U.S. Application Data

(60) Provisional application No. 61/830,316, filed on Jun. 3, 2013.

(51) Int. Cl.
*G06K 9/34* (2006.01)
*A63F 13/216* (2014.01)
*A63F 13/655* (2014.01)
*A63F 13/87* (2014.01)
*A63F 13/352* (2014.01)

(52) U.S. Cl.
CPC ........... *A63F 13/216* (2014.09); *A63F 13/352* (2014.09); *A63F 13/655* (2014.09); *A63F 13/87* (2014.09); *A63F 2300/8064* (2013.01)

(58) Field of Classification Search
CPC .... A63F 13/216; A63F 13/352; A63F 13/655; A63F 13/87; A63F 2300/695; A63F 13/10; A63F 13/12; A63F 2300/1087; G06K 9/0014; G06K 9/00221; G06K 9/00234; G06K 9/0055; G06K 9/00557; G06K 9/3233; G06K 9/34; G06K 9/46; G06K 9/6202; G06K 15/1851; G06K 15/1863; G06T 19/00; G06T 2200/24; H04N 21/4781
See application file for complete search history.

(56) References Cited

U.S. PATENT DOCUMENTS

| | | | | |
|---|---|---|---|---|
| 7,878,891 | B2 * | 2/2011 | Chiu | A63F 13/10 463/11 |
| 8,628,087 | B2 * | 1/2014 | Knowlton | A63F 9/10 273/153 R |
| 2015/0273336 | A1 * | 10/2015 | Schmitt | A63F 13/63 463/31 |
| 2015/0352435 | A1 * | 12/2015 | Imai | A63F 13/2145 463/9 |

* cited by examiner

*Primary Examiner* — Jose Couso
(74) *Attorney, Agent, or Firm* — Leason Ellis LLP

(57) ABSTRACT

A computer implemented method defines game pieces for play which can complement a natural human tendency to be attracted by people's faces. The game is based on segmenting an image of a user's face under control of a programmed processor, the user's face being captured by the mobile application or provided to it, and then turned into a plurality of segments. A reconstituted image of a face made up of multiple segments from two or more different users for presentation to each respective user in a user interface. A user can select or be selected for a game, which once started has each user revealing a further part of their image to the other until either the whole image of both are revealed and the game is won and they can further communicate. Alternatively a user loses by having their image segment rejected with no further communication available.

20 Claims, 11 Drawing Sheets

Figure 9

| 1 | 2 |
|---|---|
| 3 | 4 |
| 5 | 6 |
| 7 | 8 |

Figure 10

| 1 - Left hairline area | 2 - Right hairline area |
|---|---|
| 3 - Right eye area | 4 Right eye area |
| 5 - Left nose area | 6 - Right nose area |
| 7 - Left mouth area | 8 - Right mouth area |

Figure 11

| A | | | B | | | C | | | D | |
|---|---|---|---|---|---|---|---|---|---|---|
| 1 | 2 | | 1 | 2 | | 1 | 2 | | 1 | 2 |
| 3 | 4 | | 3 | 4 | | 3 | 4 | | 3 | 4 |
| 5 | 6 | | 5 | 6 | | 5 | 6 | | 5 | 6 |
| 7 | 8 | | 7 | 8 | | 7 | 8 | | 7 | 8 |

| E | | | F | | | G | | | H | |
|---|---|---|---|---|---|---|---|---|---|---|
| 1 | 2 | | 1 | 2 | | 1 | 2 | | 1 | 2 |
| 3 | 4 | | 3 | 4 | | 3 | 4 | | 3 | 4 |
| 5 | 6 | | 5 | 6 | | 5 | 6 | | 5 | 6 |
| 7 | 8 | | 7 | 8 | | 7 | 8 | | 7 | 8 |

| I | |
|---|---|
| 1 | 2 |
| 3 | 4 |
| 5 | 6 |
| 7 | 8 |

| Collage / image segments served to A | |
|---|---|
| I1 | B2 |
| C3 | D4 |
| E5 | F6 |
| G7 | H8 |

| Collage / image segments served to I | |
|---|---|
| A1 | B2 |
| C3 | D4 |
| E5 | F6 |
| G7 | H8 |

25

SOCIAL GAME CONCERNING PHOTOGRAPH MANIPULATION FOR PLAY ACROSS DISTRIBUTED DEVICES

This patent application claims the benefit of priority under 35 U.S.C. Section 119(e) of U.S. Provisional Application No. 61/830,316, filed Jun. 3, 2013, which is hereby incorporated by reference as if set forth in its entirety herein.

FIELD OF THE INVENTION

The present disclosure generally relates to a mobile and web based social game of attraction, using but not limited to a display of a plurality of photo segments, notably facial segments amalgamated together from different individuals.

BACKGROUND OF THE INVENTION

There is enormous growth in the use of social web and mobile applications such as Facebook and Instagram, these applications heavily rely on the increasing comfort and desire of people to share photos. Similarly, there has been continued growth in websites and mobile applications that connect people, either generally to socialize or to meet on a romantic date, although online dating methods have not markedly changed since they were first introduced.

On the web and in social applications there is also a growing trend of gamification, which comprises techniques to leverage people's natural desires for competition, achievement, status, self-expression, altruism, and closure (Wikipedia). An example of a gamification social application is FourSquare where people rise in status and rewards by checking regularly into local places such as coffee shops, using their mobile device location based sensors to confirm their presence.

There have been numerous studies on what features make a face attractive such as a study entitled Human Facial Attraction and Sexual Selection by Karl Grammer and Randy Thornhill. Humans from birth have a natural tendency to focus and be fascinated by faces and facial features, as can be learned from a study entitled the Development of infants' attention to faces during the first year by Michael C. Frank, Edward Vul and Scott P. Johnson.

There are already many pre-existing techniques and applications for mobile applications to take photos and identify facial areas. This functionality is already built into many smart mobile devices and can be utilised by the invention.

This invention draws on the universal principle that people are attracted to photos and, in particular, faces and facial features, and then (a) combines that with the ability to take and share photos including facial photos using mobile devices and the pre-existing automated photo manipulation techniques, (b) adds the gamification of what visually attracts one individual to another facial feature by facial feature, and (c) provides people the opportunity to connect by playing the application generally, or by playing with others while attending a pre-determined event. The present invention answers a need for a social method that enables people to identify others that attract them, through a stimulating game, adding fascination and anticipation.

BRIEF DESCRIPTION OF THE DRAWING FIGURES

FIG. 9 is an example of an array of photo segments made up of 8 parts.

FIG. 10 is an example of an array of photo segments making up a collage of portions of a face.

FIG. 11 identifies how an array of individual photo segments from multiple users are displayed to specific users.

FIG. 11A identifies how a collage of photo segments from multiple users is displayed to a specific user A FIG. 11B identifies how a collage of photo segments from multiple users is displayed to a specific user I

DETAILED DESCRIPTION OF CERTAIN EMBODIMENTS OF THE INVENTION

By way of overview and introduction, and with reference to FIG. 1, embodiments of the present invention connect a game server 110 to a network 120, such as the Internet, for communications by and between devices 130, 140, with an object of the communications being to engage each user's interest and provide entertainment, as more particularly described herein below. The game server 110 typically comprises one or more webservers and further servers behind a firewall, such as application server(s), but for simplicity, and without loss of generality, they are illustrated collectively as a single server. The devices can take the form of mobile devices 130A, 130B (more generally, "130"), though there can be a multiplicity of such devices connectable through conventional communication protocols to the game server 110. Likewise, the devices can take the form of stationary devices 140A, 140B (more generally, "140"), though there can also be a multiplicity of such devices connectable through conventional communication protocols to the game server 110. Each device 130, 140 can run an application locally, or game play can be implemented by code executing in sessions managed by code executing in one or more processors at the game server 110.

Figure 1:
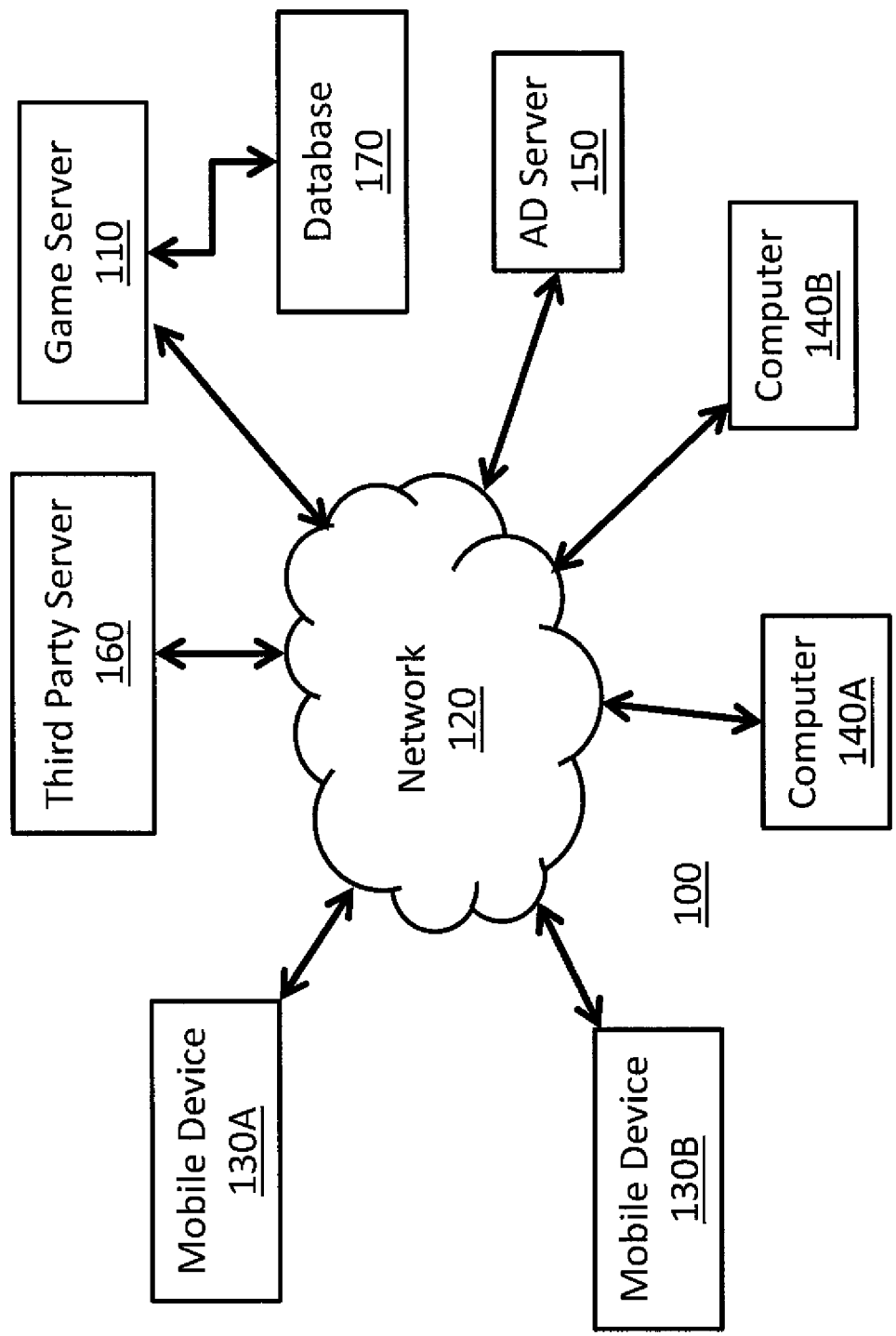
FIG. 1 shows one possible network arrangement in which games can be implemented in accordance with one or more embodiments of the invention.

The servers and devices in the network diagram of FIG. 1 each include at least one processor that is configurable by code to implement the functionality of the various embodiments of the invention described herein. The communications over the network can assume any of a variety of conventional formats and form no part of the present invention. As a non-limiting example, communications can be by secure connections over TCP/IP. The machines can operate on a variety of platforms and can utilize any number of known operating systems. The network can comprise computer networks, telephone networks, satellite networks or combinations of these and other network types so long as communications can be conveyed among the various clients and servers.

Optionally, application executing on the devices 130, 140, the game server 110, or a third party server 160, can coordinate with other servers to deliver further content. For instance, an ad server 150 can be part of an advertisement management system configured to serve ads in general or based on targeted parameters in any of a variety of manners as is conventional in the art. The third party server 160 can be a hosted site that integrates the functionality and game play of the game server 110 with its content. As one non-limiting example, the third party server 160 can comprise an application server that provides an online dating website to users on the network 120 which is designed to match two people with each other in connection with a possible relationship between them. In this example, the functionality of the game server 110 including the interactive elements provided to users is served in conjunction with content from the third party server, or is served to users of the devices 130, 140 as a result of interaction with content provided by the third party server.

Using mobile device 130 features provided by most standard smart tablets or phones, a photo is taken by a user, or an existing photo is provided, for upload to an application executing on the game server 110, as described more particularly below, and is stored in a database 170 on server(s) that contain at least portions of the application's code. As will be appreciated, photos can be taken and provided to the game server 110 from devices other than mobile devices, such as stationary devices 140. For ease of discussion, but without loss of generality, the following discussion assumes that users are accessing the game server 110 using mobile devices 130.

Existing mechanisms and applications for mobile devices exist to allow a user to identify, for instance, a user's eyes, nose, mouth and other image attributes after an upload of the photo is undertaken. The location of these attributes/features included within the image data of the photo are stored along with the photo in the database 170. In a variation, as will be understood by persons having ordinary skill in the art, the application itself or code executing at the game server 110, after upload, can process the photo to identify various image attributes, including the ones noted above. This latter arrangement is preferred as it reduces the effort required by users, and automates preparation of photo segments for use in a particular game using a segmentation algorithm implemented by code executing in a processor of the game server 110 to segment photos in view of attributes that identify facial features or other features that are part of the photo being segmented. The attributes each fall into an array of segments which together constitute the original photo. The shape and size of the array can range from one column to several and can have four to twelve rows, and more preferably between 6 and 8 rows.

In one implementation, the application executes code which configures a processor on the mobile device 130 to determine specific facial characteristics of users such as eye color, eye glass wearer, skin color, hair type, fullness and redness of lips, together with other attributes. In another implementation, such determinations are made at the game server 110 with which the application on the mobile device 130 communicates. Preferably, the determinations are stored at the server.

The photo for game play can be that of the user's face. Additionally, embodiments of the invention can include photos of body areas of the user other than the face, which can form an extension to, or variation of the game. The areas of the face shown provide key visual clues to attraction, with a focus on the mouth, nose, eyes and the hair line segment. Another embodiment can include the person's ears. Using existing mechanisms for the capture of sound (e.g., a microphone associated with the mobile device), another implementation of the invention can include sound recordings of the user's voice which can be utilized as one or more pieces (sound snippets) exposed to the other user as part of the gameplay or for playback before, during, or after gameplay, as described more completely below.

Using the location of the attributes that identify facial features at intended locations within an array, each user's uploaded photo is segmented by the application into a consistent plurality of parts and each part assigned to a position in an array, stored on the server 110 by the application executing thereat. That is, code executing in the processor of the game server 110 configures the processor to segment the uploaded photo and assign each segment to a respective position in the array, and such segmentation is performed consistently with respect to the attributes and features being identified by the user, or by the application, as the case may be, for use in a particular game. The array can have columns and rows of a variety of granularity including (Column×Row): 1×6, 1×8, 2×6, 2×8, 3×6, 3×8, and so on.

During game play, each respective user is presented with an amalgam of photo elements or segments (i.e., a collage), with each photo segment being from a different user, as one example. More specifically, the game server 110 communicates the data elements for inclusion in a game executing on the mobile device 130. The game can comprise an application stored on the mobile device or can be presented through a browser-like interface. The collage is displayed at the mobile device in a specific order and is lined up to reconstitute, in the embodiment of a face, a recognizable shape of a face made up of the individual constituent segments of photos each from a different one of the plurality of users. In another embodiment, the collage consists of segments from two or more of the plurality of users. This can be seen in FIG. 1A where six photo elements are displayed to the user and in FIG. 9 and FIG. 10 which show, schematically, arrays of eight photo elements. The application executing on the mobile device 130 configures the processor of the device to respond to interaction with the presentation of the segments I the collage, as well as with other controls provided by the application such as the options 7 and so on.

FIG. 11 identifies how facial collages made up of different users' photo segments are served up from the database 170 to the mobile or web application, showing nine users 23 labelled A-I, in this embodiment, with each user's photo split in eight segments and stored, alongside their original photo on the server 110 in the database 170. FIG. 10 identifies, for a face, those facial feature segments stored in such an array. FIG. 11A identifies the collage of segmented photo parts served by the database 170 to user A labelled 24 and FIG. 11B identifies user I labelled 25. In FIG. 11A User A has different photo segments served up from users I, B, C, D, E, F, G and H as identified from their respective positions in the array making up a collage of a face. In FIG. 11B User I has different photo segments served up from users A, B, C, D, E, F, G and H as identified from their respective positions in the array making up a collage of a face. In embodiments of the invention, the collage can be defined by code executing in the game server 110 which communicates the photo segments to the mobile devices 130 using photo segments of two or more users so that the collage differs from the array of photo elements defined from a single photo of a single user in at least one of the positions in the array. As shown in FIGS. 10,11, 11A and 11B the collage of photo segments provided to the mobile device 130 of user A and to user I includes, by way of example, images of eight different players—and so this implementation comprises a game served which is not a one-on-one game, but rather a multi-player game. As will be appreciated, each of collage can be defined dynamically as needed by one or more mobile devices 130, optionally in view of information stored concerning the user of particular mobile devices (e.g., stored information concerning the user's preferences).

Figure 1A:
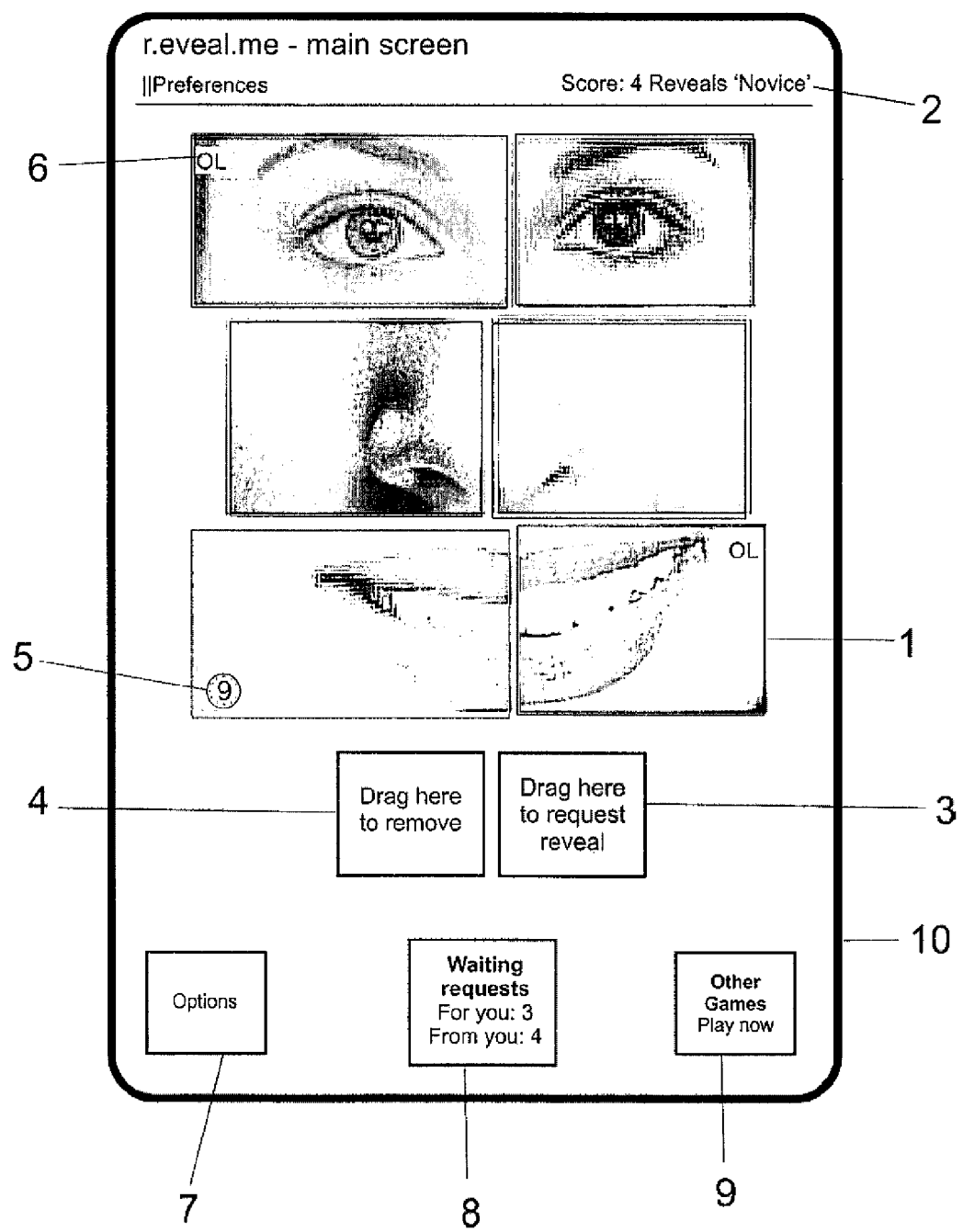
FIG. 1A shows an example of the games main selection screen, where the segments of photos from other individual users are displayed to the first user.

For devices 130, 140 with lower screen resolutions the users' photo can be organized so that the photo segments displayed are a smaller subset than those available in the data store 170, while for devices with larger screen resolutions the number of segments displayed in the array from the data store can be greater. In FIG. 1A it can be seen that there are 6 photo elements displayed with segment 1 showing the right mouth area, corresponding to segment 8 in FIG. 10. which identifies an array with 8 photo segments.

The photo segments are arranged by an algorithm implemented as code that executes in a processor of the game server 110 in order to display the photo segments into one or more grid patterns. Alternatively, because the photo segments are each assigned to a position in the arrays shown schematically in FIGS. 9 and 10, code executing at the mobile device 130 can govern the presentation of each particular photo segment on the display of the mobile device. In one embodiment of this invention, the photo segment has a uniform size. In another embodiment, each photo segment can have a different size to another one, but otherwise conform to predetermined grid patterns.

During game play, the application executing on the mobile device is configured to respond to interaction with a particular photo segment associated with a particular user, by, for instance, clicking or tapping on the photo segment, by revealing a range of information about that user associated with the interacted segment (optionally with that user's permission). This information can grow over time and, in this embodiment for photos of a face, includes: location of that user by interacting with the eye segment; hear snippets from favourite music tracks of that user by interacting with another segment or list favourite foods or hear a voice recording from that user by interacting with the mouth segment. The foregoing are exemplary types of information that can be revealed as a result of interaction with a given photo segment.

FIG. 1A shows the game's main screen. The mobile device 130 has a screen 10 which shows the display of the game being presented by an application or browser-session executing, at least in part, at the mobile device. The score and rank of the user is shown labelled 2. A combination of photo segments from different users are displayed. 1 presents the right hand side mouth segment with five other segments shown in the array making up a collage of a face with segments from different users.

An alternative implementation for display of this part of the game has photo segments jumbled rather than ordered in the form of a collage of a face, as shown. In this implementation, the photo segments are assigned to a position in the arrays, as in the other implementations, but the application executing on the mobile device has code executing to configure the processor to permit placement of individual photo segments in positions other than their respective assignments. As a consequence, the photo segments can be jumbled in the interface provided at the display 10, while the correct position in the array of each photo segment is known to the application and can be used in connection with game play or scoring.

Each user can participate in the game whether online or offline, with each segment of the collage representing a user, 6 shows the marking "OL" which identifies that the user whose photo segment is displayed is currently online and logged into the game at that present time, alternative symbols identifying whether the user is offline or online can be used to mark the segments. Communications between the mobile device 130 and the game server 110 provide status information concerning whether other users are online, logged in, and possibly other information (e.g., chat session data, etc.). Status information can be communicated over the network 120 during the time that game play is active or inactive.

In one embodiment, the application executing at the mobile device 130 is configured by code executing in a processor thereof to display each user's photo segment to another user for a limited period of time where the number of seconds or other measurement of time remaining is displayed 5. Once the time has elapsed, if the first user has not interacted with a displayed photo segment from a particular user, as tested by the code executing in the processor, then that image segment can be replaced in the same location with a photo segment of the same type, for instance the left hand side mouth, from another user.

In another embodiment, users specify through event data that is input into a form or the like provided by the application or to the third party server 160 that they are attending a particular event at a particular location, and then choose to play the game with just the attendees of that event so that the universe of users from which the photo segments are drawn is limited to those attending the particular event. The application executing at the game server 110 maintains a database record of users who have specified that they are attending a particular event so that photo segments can be served from the subset of users noted as attending the particular event. Optionally, geolocation data can be communicated by the mobile devices 130 to confirm attendance of a given user at the particular event, with the geolocation confirmation providing a basis for serving photo segments of that particular user to other users confirmed as being in attendance. The geolocation data can be provided by a GPS module within the mobile device and can provide information sufficient to test and confirm the location of the mobile device 130 at a particular time. However, the universe of users can be established and utilized by the game server 110 to serve games to users indicating an interest in attending the particular event prior to the event and, hence, without regard to whether the user actually arrives or attends the particular event.

In one embodiment of the invention, during game play on the main screen the user can interact with a photo segment, removing or rejecting that particular user from play 4, the image segment is then replaced with that from an alternative user in the same array location with a photo segment of the same type, maintaining each segment of the collage is made up of photo segments from a range of different users. Code executing in the processor of the mobile device 130 monitors the user interface for interaction and if user initiates an interaction such as a drag operation, for instance, to the location 4 on the display, then the photo segment is removed from the collage, as described above. Thereafter, the code configures the processor to replace the photo segment, as noted. Rejected photo segments are communicated to the game server 110 and marked in the database 170 on the record of the user who rejected the photo segment. The rejected photo segment associated with the user just rejected will not be displayed in future games for the user who rejected the other user, and vice versa. The game server 110 can be programmed to update the score of the rejected user to reflect the rejection.

The game server 110 comprises code executing in its processor to configure the server to record all users' segment selections and rejections, and use this information to determine, over time, the preferences of the users. As a result, the game server can provide photo segments to individual mobile devices in a manner that presents photo segments of individuals that a given user is more likely to find attractive. For instance, if a user is consistently requesting the server 110 for reveal games with users with green eyes, that value of the eye color attribute will have a higher frequency than other values for eye color, and the server 110 can then implement a strategy for preferential delivery of photo segments of users having green eyes to the user making such requests. Additionally, the server 110 can include code that implements an algorithm which processes information received from users in order to, say, combine physical preference data with psychometric data gathered during reveal games. In this manner, the game server 110 can further refine the set of individuals from which segments are to be selected and displayed to a user at a particular mobile device 130.

Optionally, regardless of whether psychometric profiling questions are included during the course of game play, in a variation of the reveal game, a version can execute in the mobile devices which has distinct phases (e.g., two phases), separated by a time gap. The time gap span a time between registering for an event and participating in an event, or participating in an event and a post-event time period, and numerous other circumstances in which users engage in a particular game which is to be played on either side of a time gap.

Figure 2:
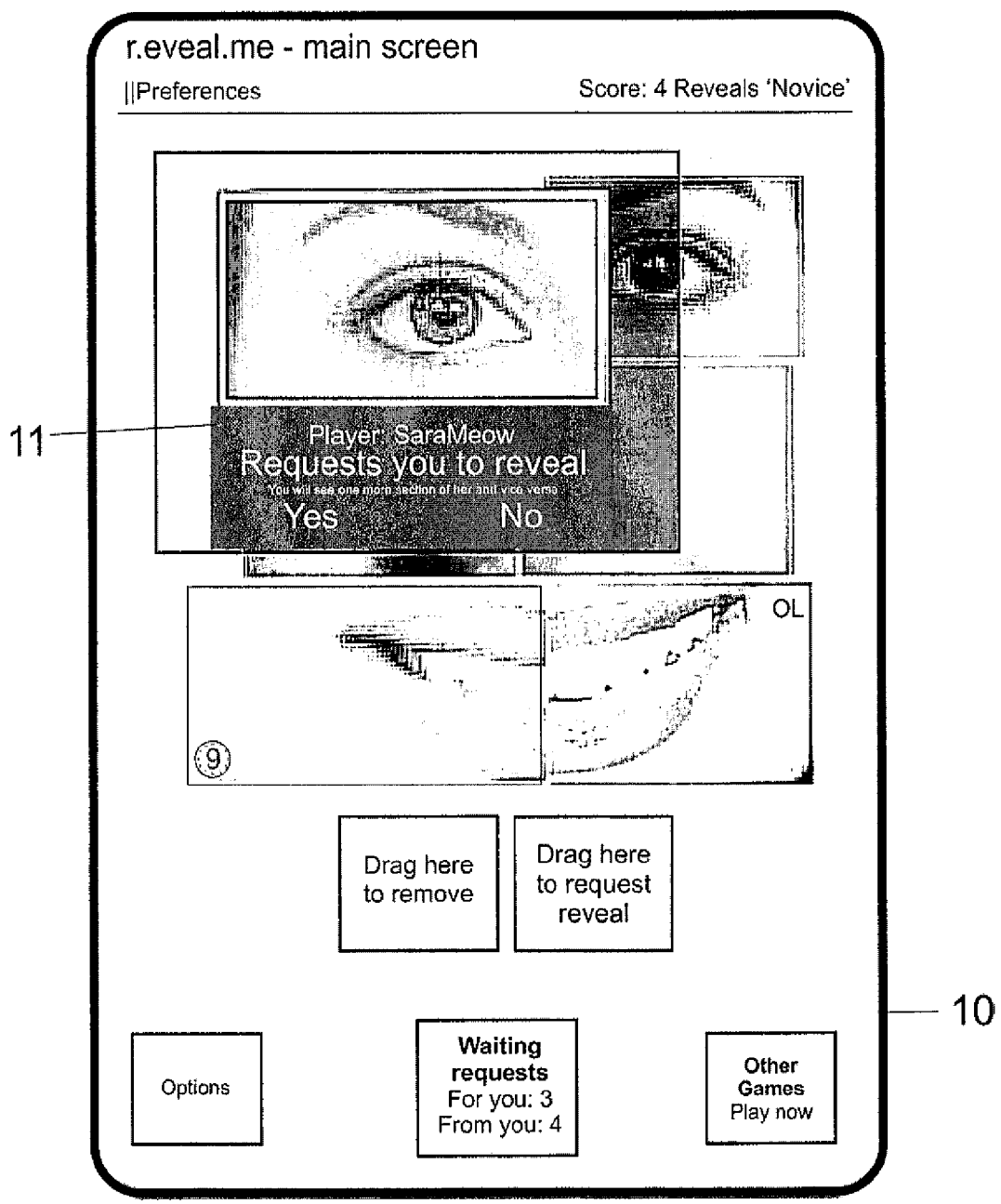
FIG. 2 shows an example of the games main selection screen, where a user whose photo segment is highlighted requests to play a reveal game with the first user.
Figure 3:
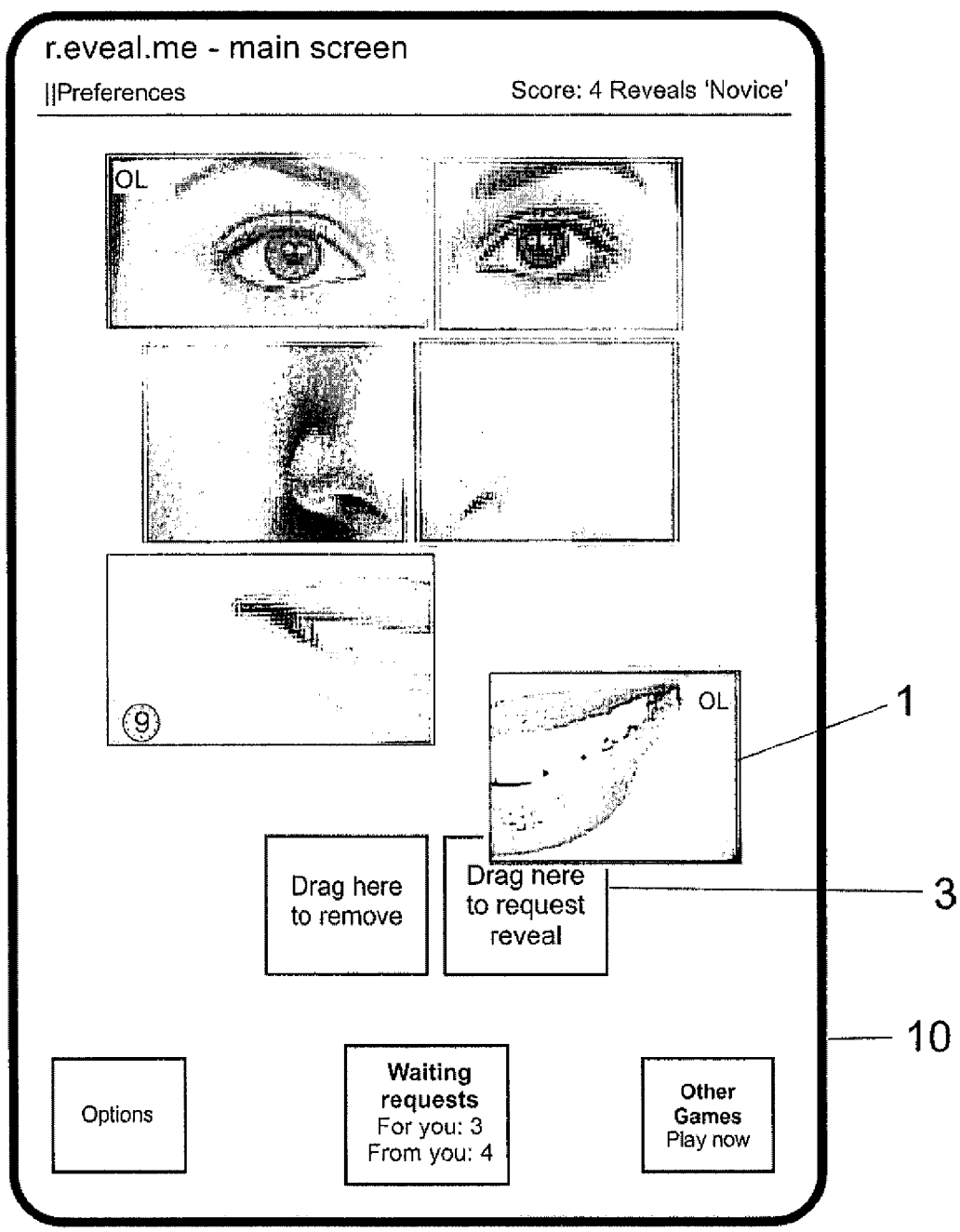
FIG. 3 shows an example of the games main selection screen, here the first user requests to play a reveal game with the user of the selected photo segment.

During game play on the main screen 10 the first user can interact with a photo segment requesting to start a Reveal game. A Reveal game is one in which users decide if they want to show another segment of their respective photos to another specific user and, in response, see a further part of the corresponding user's photo. FIG. 2 shows the reveal request (discussed below) and FIG. 3 shows a photo segment 1 being dragged to a "Reveal request" option provided to the user through the application interface running at the mobile device 130. In this embodiment, the photo segment indicated at 1 relates to a particular user and is interacted with by dragging it to the "Reveal request" option, labelled 3. This initiates a server request which is passed to the second user (whose photo segment was just dragged) to play a one-to-one Reveal game with the second user. The application interface can respond to other forms of interaction such as tapping instead of dragging for instance. The Reveal game shown in FIGS. 4,5 and 6 can then be played if the second selected user accepts the request. Both users' scores are updated to reflect a Reveal game was requested and accepted. Photo segments that have been accepted for a Reveal game are marked in the database 170 and not shown to the specific users in future games, in this embodiment.

Optionally, in a variation of the foregoing, the user can interact with the interface provided by the code executing on his or her mobile device in order to scroll the entire collage displayed on the mobile device, up, down, left or right with whole new rows or columns of photo segments taking the place of those that are no longer visible. Code can be provided to enable the user to interact with objects in the interface so as to enlarge a chosen segment for closer inspection, or to drag a chosen segment to a central or specific area in order to indicate that the segment is of interest. In particular, the mobile device 130 can load multiple photo segments in its memory for each position in the collage and use/retrieve the additional segments from memory in the event of a drag-to-remove 4 operation or in the event of a selection of a segment to select photo segments of interest. The application executing at the mobile device 130 can monitor how long a particular segment is displayed before it is scrolled or otherwise changed out of central or specific area view, whether it was brought back into view by the user, and other metrics that can be passed back to the game server 110 as information to gauge the user's taste and preferences. In other words, the attributes of the particular photo segment which the code executes to determine as being of interest to the user can be weighted and that weighting can influence the selection of future segments to be provided by the game server 110 to that user.

Figure 4:
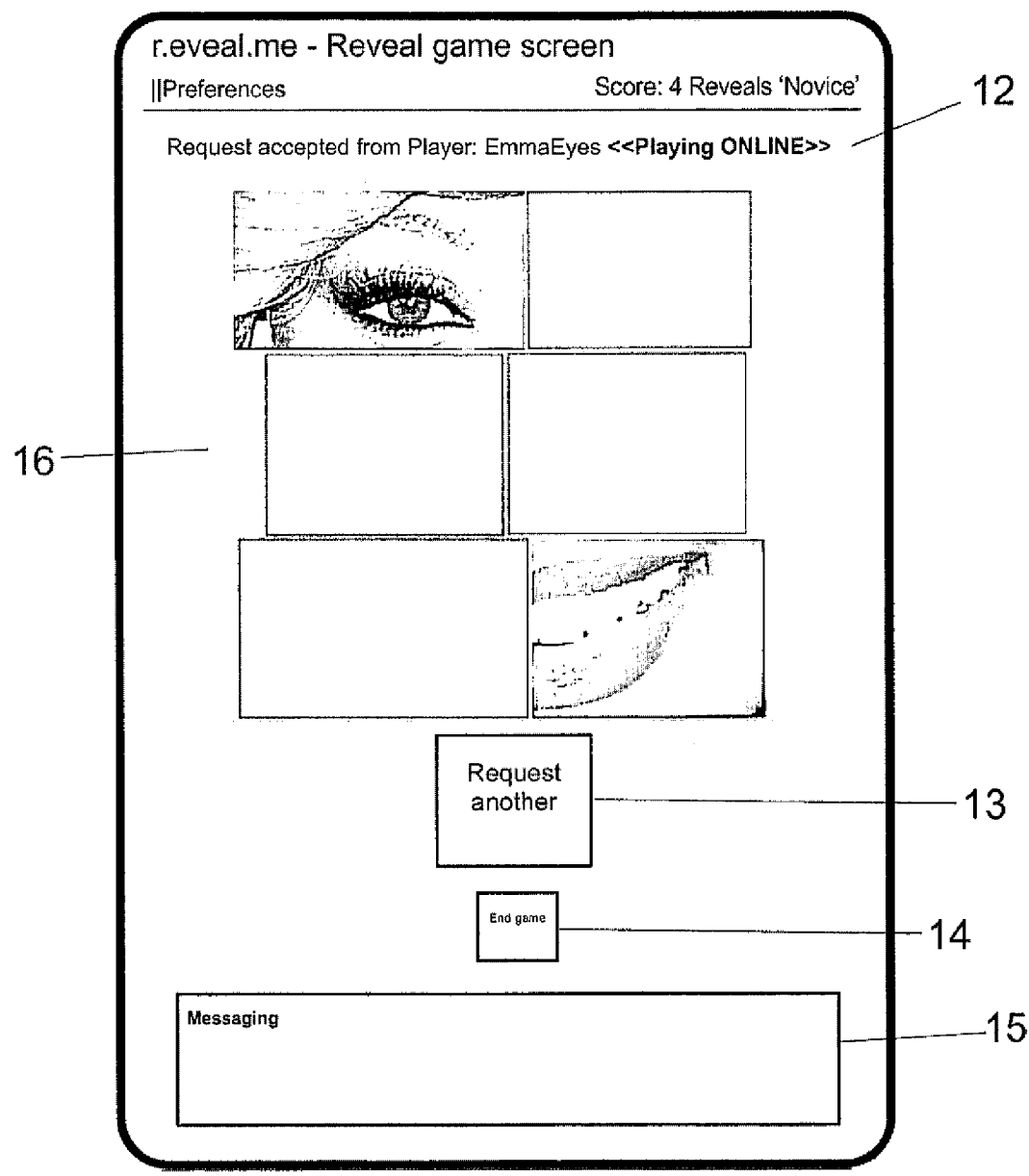
FIG. 4 shows a reveal game in play where both users playing are online.
Figure 5:
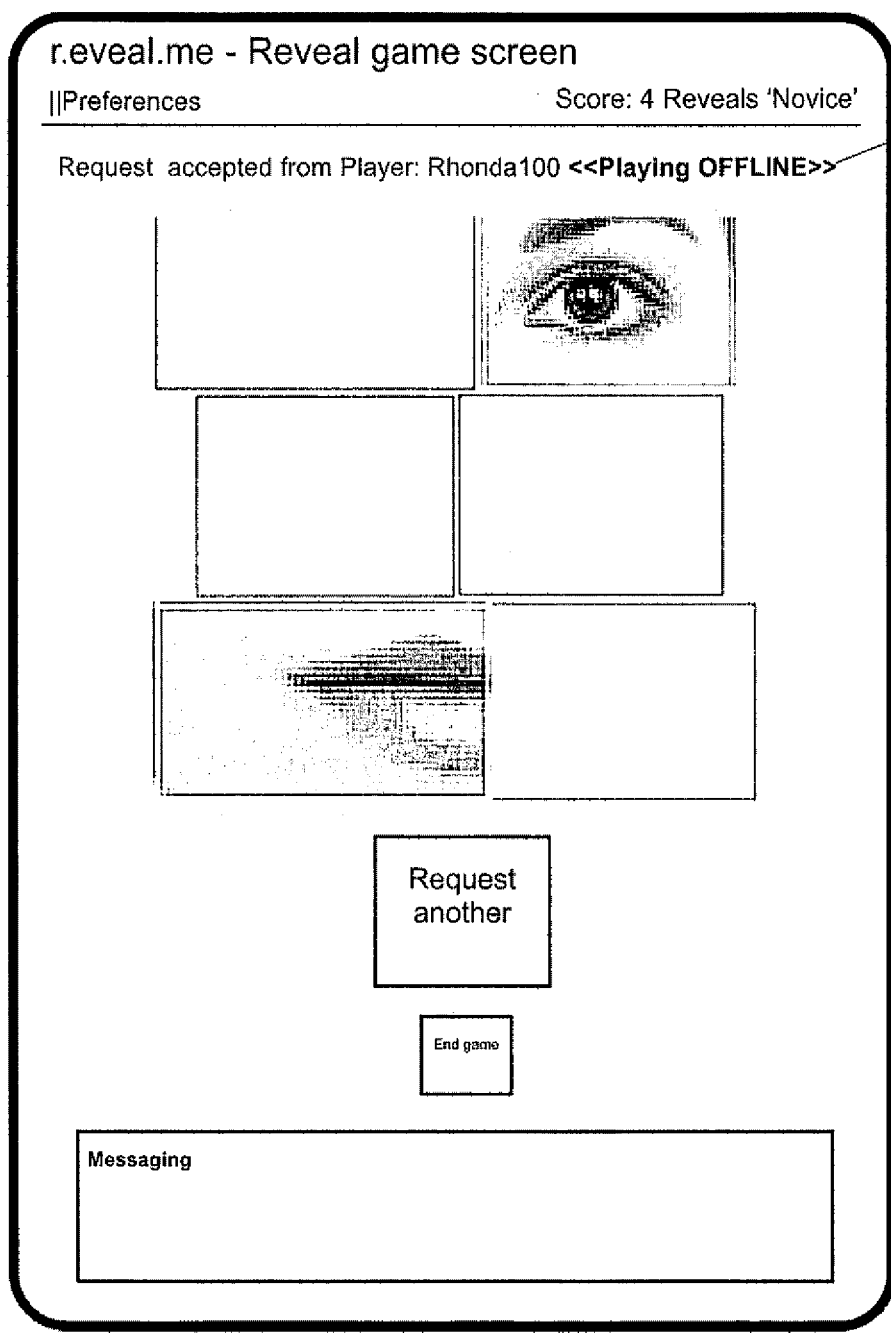
FIG. 5 shows a reveal game in play where the first user is online but the second user is offline.
Figure 6:
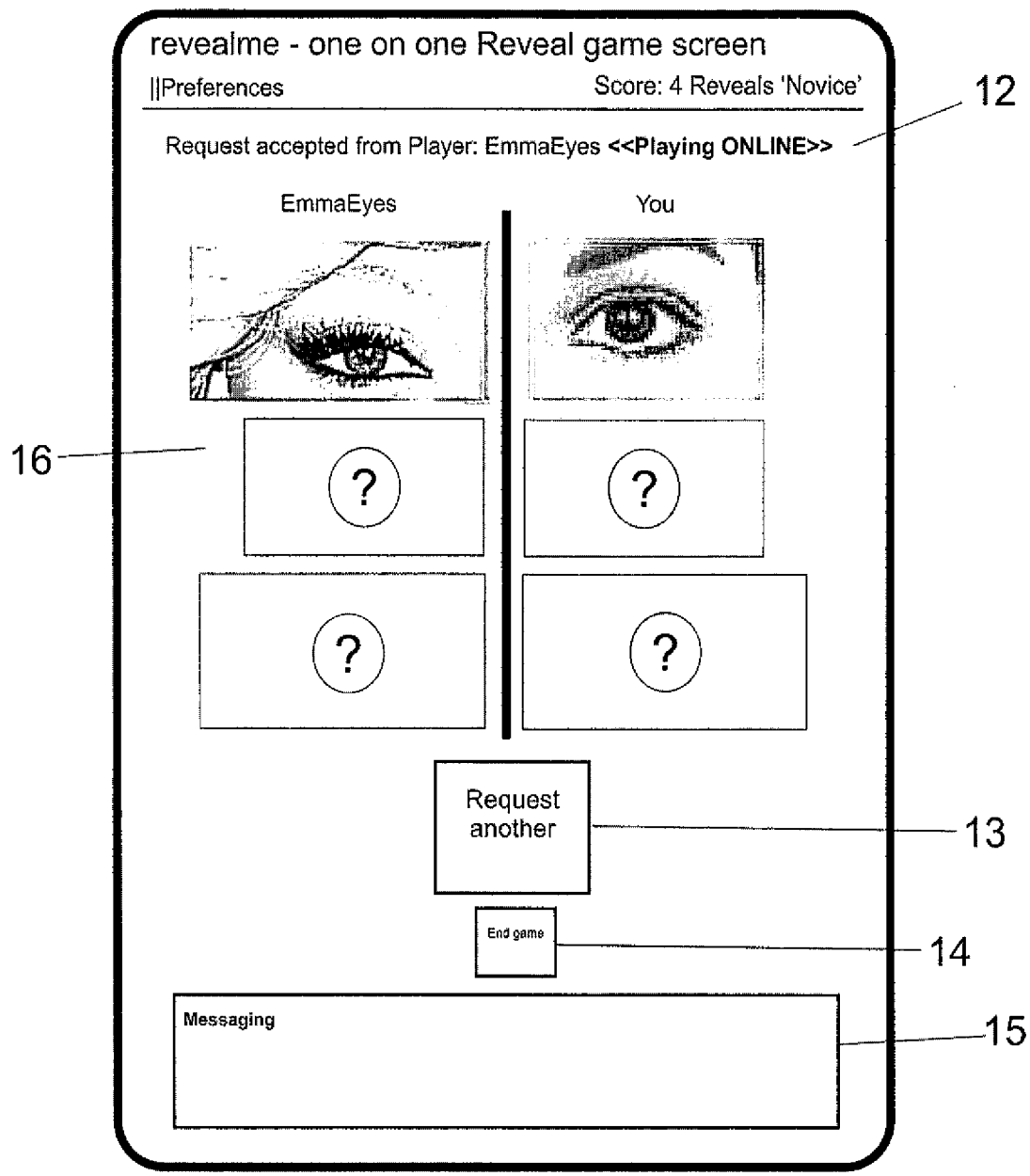
FIG. 6 shows a one-on-one, two-player reveal game embodiment where the left-hand side of a first user's face appears on the left of the collage, and the right-hand side of the second user's face appears on the right.

Referring briefly to FIG. 2, an online user who has requested to play a Reveal game with the first user causes, in this embodiment, an enlarged photo segment to highlight it relative to the photo array, presenting the request 11 to the first user during game play. If the first user accepts this request, then the code executing in the mobile device configures the game application to present the one-on-one Reveal game (sometimes referred to herein as a one-to-one game), such as shown in FIG. 4 and FIG. 5. If the first user rejects the request, the requested photo segment is marked in the database 170 on the records of the respective users and will not be displayed to them in future games and vice versa. The score of the rejected user is updated to reflect the rejection.

If a user accepts a request to play a Reveal game with another user, see FIGS. 4 and 5, a new grid is displayed and only the image segments from the first user and second user are displayed to each other. In an alternative embodiment, shown in FIG. 6, the left-hand side of one user's face appears on the left of the collage, and the right-hand side of the other user's face appears on the right. In that embodiment, the game server 110 serves to the applications executing on the two users' respective mobile devices 130 a respective collage in which the collages are defined to satisfy the further requirements that the photo segments be from only two of the plurality of users and be arranged with a Left-hand/Right-hand orientation as noted above.

During the Reveal game, the first user is able to request another segment from the second user's photo to be revealed, labelled 13 "Request another," and vice versa. For every acceptance of a request, another image segment from each player is shown to the other under control of the code executing in their respective mobile devices. The request and response can be triggered by either user and continues until all the photo segments from both users have been displayed, if this occurs it is a winning game for both users. Optionally, the game server 110 can convey all of the photo segments once a one-to-one reveal game is commenced to minimize data traffic across the network 120. Other information such as from the ad server 150 an also be conveyed in advance of presentation on the display 10, and the code executing in the local mobile device 130 can manage when and for how long such elements are displayed within the user interface.

The sequence of a one-to-one reveal game can be halted if a user rejects a request by the other user in the game. Such a command is processed by the code executing in the mobile device to cause the game to end and communications to the game server to effect scoring of a losing game for the rejected user. A Reveal game can additionally be ended by either user at any time by interacting with option button "End game" labelled 14 which results in the same actions by the code executing in the mobile device.

During an online Reveal game, the code executes to monitor responses and requests. If no response or request to Reveal a photo segment is made by a user within a pre-determined time period, the Reveal game closes and the game switches to an offline operation, thereby taking both users back to the main game screen FIG. 1A, to the request management screen FIG. 8, or to provide a suitable status message.

In one embodiment of the Reveal game each user can select which facial feature they want to reveal or request.

Figure 7:
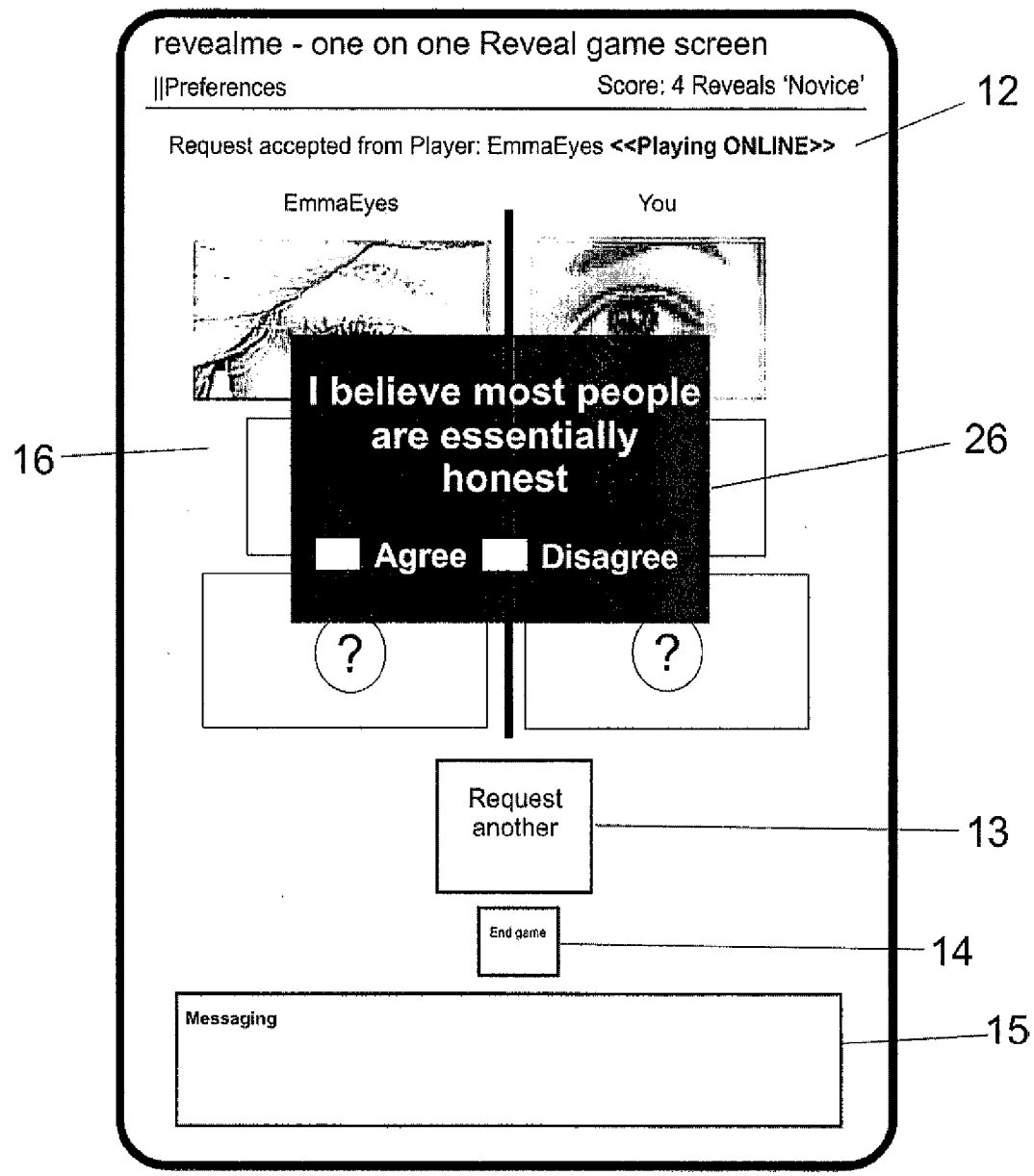
FIG. 7 shows a reveal game including interface components that provide additional interaction (e.g., mini games or questions posed between the users) in which responses are provided by each user and shared with the other as part of the game.

In another embodiment of the Reveal game, between each request and response to display an additional segment, the users plays one of an additional series of games, which are designed to encourage some interaction between the users whilst at the same time discerning some key profile or psychometric data. This is shown in FIG. 7, by way of example and not limitation. In this embodiment, a question is presented such as in a dialog box that each user has to answer before continuing with the reveal game. The result of providing responses to the question or other interaction with components 26 that interrupt the flow of the reveal game is to capture preferences and interests of each of the players.

A Reveal game can be played in real time FIG. 4 if both Players are online and logged in 12. The game can also be played offline FIG. 5 where only one player is online at a time 17. In either case, the games are implemented using software executing in mobile devices 130 and utilize communications, at one point or another, with the game server to exchange photo segments, requests, selections, preferences, ads, and other information.

In the off-line Reveal game, the online user can request to reveal or accept a request or make a refusal of a request of a Reveal game which ends the game in play. Any request or acceptance awaits the other user when they go online again and log into the game. If a further reveal request is made by a user, then the game pauses awaiting the other response, if the request is accepted then when the user next logs in the game it will continue displaying a further image segment to each user of the other. An offline Reveal game therefore works similarly to an online game with the exception that only one reveal request can be made or accepted in each session, after the request is made or received and accepted the game pauses, giving the user the ability to return to the Requests management screen FIG. 8 or the main game screen FIG. 1A.

During a Reveal game if a user ends the game or does not accept a request, the game ends and the last user to be rejected loses and that is reflected in their score.

During a Reveal game, if the game ends before both users reveal their full image, in one embodiment the images that have been revealed to the other user are marked by the database 170 not to be shown to the users by the application in the future, this data is stored in the database.

During a Reveal game if both users reveal all the photo segments to the other the application displays the original image of each user to the other; this is a winning game for both users. In one embodiment of the invention the grid and array disappears revealing each user the respective image of the other user. In this circumstance both players are able to communicate further. Photo segments from winning users in a game are marked by the database 170 and will not appear in future games for either user.

In one embodiment of this invention winning users of the Reveal game are able to send each other an Instant Message 15 or connect on Facebook or other methods of communication as determined by the preferences of each user.

Figure 8:
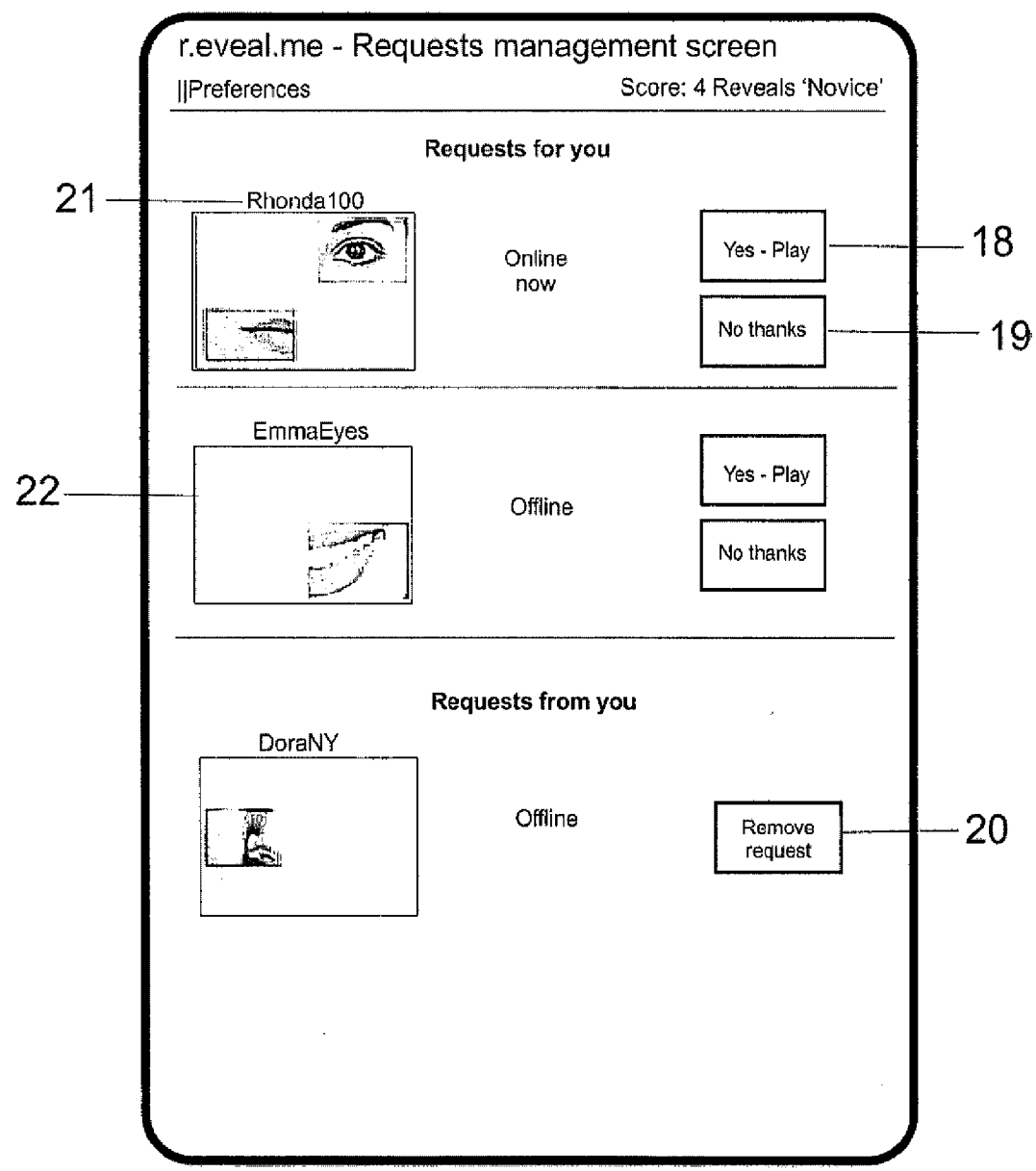
FIG. 8 shows the reveal-requests management screen.

FIG. 8 shows the requests management screen, available in one embodiment of the game by selecting the option "waiting requests" labelled 8. Here the application enables management of reveal requests that have been made by the user to other users and pending reveal-requests from other users that are awaiting response. Reveal games played offline can be continued offline or online if the other user is available online and logged into the game, a Reveal game is started by selecting the option "Yes-Play" labelled 18. A user can reject a request from this screen by selecting the option "No-thanks" labelled 19. It is also possible for a user to cancel a request to play a Reveal game "Remove request" labelled 20 if the requested user is offline and has not accepted or rejected it as yet. If the user selects the "No-thanks" option 19 then the photo segments displayed will not be displayed in the future to the users and that request will be removed from the list.

The invention stores data relating to users that indicate an interest to attend specific events. In an embodiment, the invention can promote users to play Reveal games with other attendees of the particular event. The invention application suggests events to users who are not currently attending events but may wish to attend because of their location and an analysis of the data relating to other users attending who are likely to be attractive to the user. This matching of users and events are based on psychometric data and other profiling information gathered by the application through the various game play. Data that matches users to other attending local events include: distance from the user, attraction data gathered including eye color, skin color, age and other matched preferences gathered by the application for each user. The invention then presents, as part of the usual game play, those users to each other who are attending the event that the application calculates are most likely attractive to each other.

Other functions available in the application are "Options" labelled 7 here the user can select from a range of options including what information they wish to share, including their location or select to play with other users from specific geographical areas. Other games are also available to play based on the photo segmenting methods will be available from "other games" labelled 9.

The functions describe herein can be implemented by hardware and or hardware executing code (also known as programs, software, or software applications) which include machine instructions for a programmable processor, and can be implemented in a high-level procedural and/or object-oriented programming language, and/or in assembly/machine language. As used herein, the terms machine-readable storage medium and computer-readable storage medium refer to any computer program product, apparatus and/or device (e.g., magnetic discs, optical disks, memory, Programmable Logic Devices (PLDs)) used to provide machine instructions and/or data to a programmable processor, including a machine-readable storage medium that receives machine instructions as a machine-readable signal. The term machine-readable signal refers to any signal used to provide machine instructions and/or data to a programmable processor. A machine-readable storage medium does not include a machine-readable signal.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for serving collages and collage components to a plurality of computing devices that are in communication with a server over a distributed network of computing devices, comprising:

receiving respective photos from computing devices associated with each of a plurality of users over the distributed network;

segmenting each photo using code executing in a processor of the server, the code configuring the processor to implement a segmentation algorithm which defines respective arrays of photo segments in which each photo segment has a position within its respective array;

associating in a data store each photo segment and its position with a respective user among the plurality of users;

defining a set of collages in which each has the photo segments of at least two of the plurality of users using code executing in the processor;

establishing a connection over the distributed network between the server and one or more applications executing on respective ones of at least a portion of the computing devices; and serving to each applications over the computer network a respective collage in the set of collages.

2. The method of claim 1, further comprising responding to a request, that has been received over the connection from a first one of the computing devices which is associated with a first user based on interaction with the photo segment of a second user included at a first position in the collage, for additional photo segments to be displayed of the second user on the first computing device.

3. The method of claim 2, wherein the response to the request includes the steps of:

identifying from the data store the second user associated with the interacted photo segment, sending a message to a second computing device associated with the second user; and if an approval is received in response to the message, responding to the request by serving for display on the first computing device at the first position in the collage the photo segment of the second user that is associated with that position in the second user's array.

4. The method of claim 3, further comprising:

identifying from the data store the first user; and if the approval is received in response to the message, serving to the second user for display at the second computing device the photo segment of the first user which is associated with the first position of the interacted photo segment.

5. The method of claim 4, further comprising the steps of:
receiving a further request over the connection from the first computing device to display an additional photo segment of the second user at another position in the array;
sending a further message to the second computing device;
if an approval is received in response to the further message, responding to the further request by serving for display at said another position in the array the photo segment of the second user that is associated with that position in the second user's array; and
repeating the receiving, sending and responding steps until either (a) all photo segments in the second user's array are displayed at the first computing device, or (b) if the approval is not received in response to the repeated further message.

6. The method of claim 5, further comprising the steps of:
if the approval is received in response to the further message, serving to the second user for display at the second computing device one or more photo segments of the first user which are associated with any positions that have been served to the first user.

7. The method as in claim 1, wherein the code implementing the segmentation algorithm further configures the processor to align one or more image features in each photo with one or more grid patterns, and wherein the segmentation algorithm defines the respective arrays of photo segments in relation to the grid patterns.

8. The method as in claim 7, wherein the photo segments comprise respective portions of an image of a face.

9. The method as in claim 1, further comprising the step of providing one or more interface components during game play which require at least one response by the first user prior to continuing the game, and presenting information relating to the response to the second user concerning the first user response.

10. The method as in claim 1, further comprising
receiving event data from a plurality of the users; and
serving only those photo segments associated with the plurality of users to the plurality of users.

11. The method as in claim 10, wherein the serving step is conditioned upon a successful test of geolocation data to confirm whether a given user is at the event.

12. A method for playing a manipulation game among several computing devices connected over a distributed network in which a plurality of photos associated with a respective plurality of users have been segmented according to a segmentation algorithm to define respective arrays of photo segments each having a position in the array and each array comprising a respective photo, comprising the steps of:
receiving at a first computing device connected over the distributed network a collage of photo segments from a server in which each collage comprises, for each position in the array, the photo segment of one of the plurality of users;
displaying the collage of the photo segments on a screen of the first computing device;
tracking a time interval commencing with the display of a photo segment at a particular position in the collage using code executing in a processor of the first computing device; and
using code executing in the processor of the first computing device, replacing the photo segment in the collage at the particular position when there is an absence of interaction with that particular position after the time interval exceeds a threshold time period.

13. The method as in claim 12, further comprising the step of displaying information relating to the time interval before replacing the photo segment in the collage at the particular position.

14. The method as in claim 12, further comprising the step of:
responding to interaction with the photo segment at the particular position by causing the first computing device to output further information concerning the user among the plurality of users who is associated with the interacted photo segment.

15. The method as in claim 14, wherein the further information is retrieved over the distributed network from a server and comprises information maintained in a data store in association with the user who is associated with the interacted photo segment.

16. The method as in claim 15, wherein the interacted photo segment is associated in the data store with one or more of the following:
a location of the user who is associated with the interacted photo segment;
a portion of a sound track identified by the user who is associated with the interacted photo segment; and
one or more foods identified by the user associated with the interacted photo segment.

17. The method as in claim 12, further comprising the step of providing a communication channel over the distributed network between the first computing device of a first user and a second computing device of a second user, wherein at least one photo segment associated with the second user is included in the collage being displayed on the first computing device.

18. The method as in claim 14, wherein the further information is retrieved over the distributed network and comprises an online status of the users included in the collage being displayed on the first computing device.

19. The method as in claim 12, further comprising the step of responding to interaction with one of the photo segments in the collage, using code executing in the processor, by sending a request to the server to request commencement of a reveal-photo-segments game with a user associated with the interacted photo segment.

20. The method of claim 12, wherein the collage comprises an array of photo segments that combine to present an image of a face and wherein the segmentation algorithm operates upon faces.

* * * * *